UNITED STATES PATENT OFFICE 1,930,301

INDELIBLE PRINT

Hermann Beckmann, Berlin-Zehlendorf, German

No Drawing. Application October 2, 1930, Serial No. 486,063, and in Germany October 12, 1929

5 Claims. (Cl. 281—1)

My invention refers to printed matter and more especially to prints which are substantially indelible.

As a rule prints of all kinds are produced with paper as carrier which is however very little resistant against the action of water and chemicals. If prints are to be produced which are substantially indelible, metal, enamel, wood, glass, porcelain, celluloid, stone etc are used as carriers. Some of these carriers however are only partly stable and the prints do not properly adhere to them, or they are water and oil repellent and some of them require burning in order to render the print permanent. Others, such as textile fabrics, stones and the like are too coarse grained to be adapted for use in the reproduction of prints full of details.

I have now found that porous rubber, the pores of which, in contradistinction to rubber sponge, are so small as to be almost or altogether invisible to the naked eye, is particularly suited for use as carrier for prints. According to this invention I use as a carrier for printed matter porous rubber, either hard or soft rubber, for instance of the kind described and produced according to the method disclosed in my U. S. Patent 1,745,657 dated February 4, 1930. Into a sheet of microporous rubber the liquid in which the ink is suspended or dissolved, will readily and uniformly enter into the small pores and will thus produce an intimate union between the ink and the ink carrier. For instance if microporous rubber is printed upon in the usual manner with ordinary printer's ink, the ink will adhere to it so strongly, that it will be impossible to remove it from the rubber by the action of soap or by boiling. The use of microporous rubber offers the further advantage that ink deposited thereon will dry extremely fast, the microporous rubber having an absorbing action far exceeding that of blotting paper.

I have found that microporous rubber is also excellently adapted to be printed upon by machinery and also by multi-color printing. Although rubber as such is known to be subject to elongation under pressure, I have found that sheets of microporous rubber when subjected to the printing process in the press, will stretch only very little owing to the fact that, in consequence of the high friction between the rubber and the printing cylinder, the rubber offers a very high resistance to displacement.

Inks or colors deposited on microporous rubber have no gloss but are dull, which is particulrly desirable in the cases of pictures and posters. For posters produced on ordinary carriers such as paper, metal etc. on being exposed to sunshine or to the light of a strong lamp will reflect the light thrown thereon in a disturbing manner.

Microporous rubber is also particularly adapted to replace paper in the case of documents, such as maps, plans etc., the carrier of which must be weather-proof, for instance for purposes of the army. If written upon with indelible ink or with an ink pencil, a sheet of microporous rubber can be exposed to rain without any danger.

The microporous rubber may be dyed before or after vulcanization, or other materials, such as for instance fibres, may be admixed to it in order to impart to it the desired color. If used in the manufacture of bank notes, the rubber may be mixed with some material, the production of which encounters particular difficulties in order to prevent imitation. Luminous paints can also be incorporated in the rubber.

Microporous rubber offers the further advantage of being highly resistive to mechanical stresses. It can be bent and folded as desired and will still become altogether smooth if submerged for a few minutes in hot water. As the chemical resistance of the rubber is an extremely high one, printed matter produced thereon with suitable colors or dye stuffs is also extremely resistive against the influences of the weather, of variations of temperature and against the action of acids.

Textile or metal fabrics etc. may be incorporated in the porous rubber before or after vulcanization in order to render it practically untearable. It is further possible to reinforce it for the same purpose by fixing the rubber sheet on a suitable carrier.

As it is possible to produce very thin sheets of microporous rubber, it can be used with advantage as an ink carrier in the production of bank notes etc.

In order to prevent the microporous rubber from absorbing any moisture after the print has been produced thereon, it may be impregnated with suitable water repellent agents either before or after the printing.

Obviously printed matter produced on microporous rubber can easily be cleaned and desinfected by washing, cleaning with soap, boiling etc.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

In the claims, the word indelible is employed in its ordinary significance, namely, as meaning that which can not be removed by washing, blotting, etc. It obviously does not mean that the prints cannot be destroyed by fire, rubber solvents, etc.

I claim:—

1. As an improved article of manufacture, an absorbable ink in combination with and absorbed in the pores of a cured, colloidal rubber article of reticulate structure having microscopically visible, filter-size pores; the said combination being substantially indelible and resistant to the action of water and of chemicals.

2. As an improved article of manufacture, a water-proof indelible ink in combination with and absorbed in the pores of a cured, colloidal rubber article of reticulate structure having microscopically visible, filter-size pores, the said combination being substantially indelible and weather-proof.

3. The article of claim 1 impregnated with a water repellant agent.

4. The article of claim 1 in which reinforcing material has been incorporated rendering the same resistant to tearing.

5. The article of claim 1 in which is incorporated a filling material difficult to imitate.

HERMANN BECKMANN.